July 28, 1942.  F. E. WOLCOTT  2,291,427
COFFEE MAKER
Filed Nov. 1, 1938
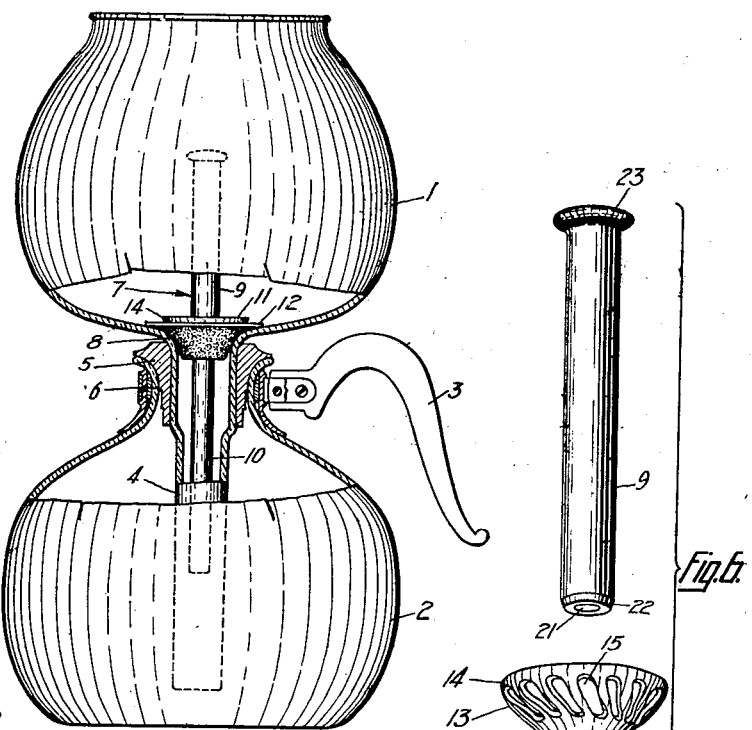
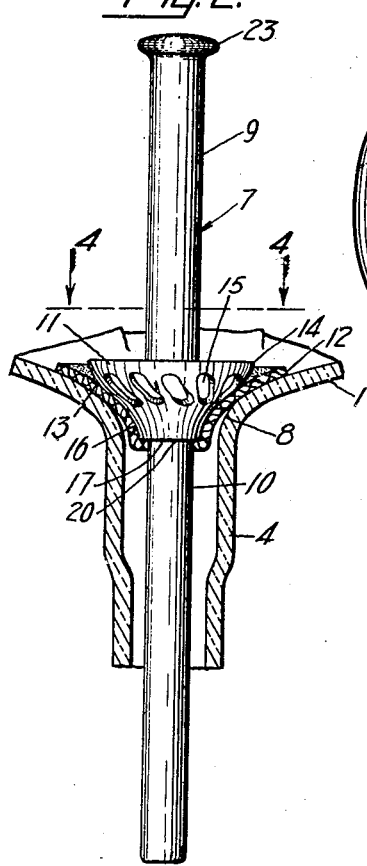
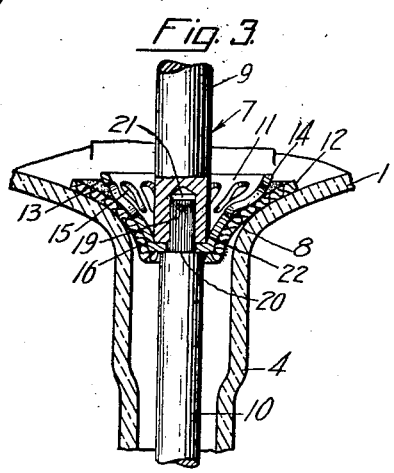
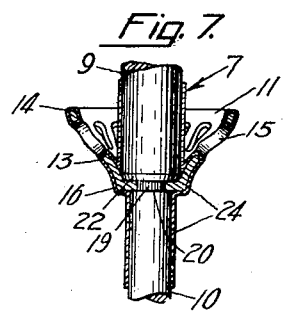
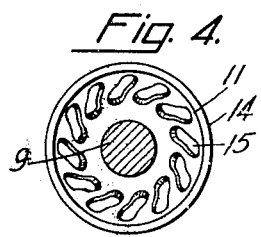
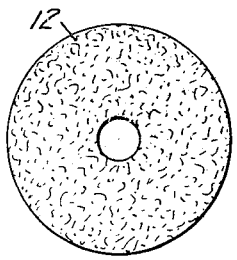
INVENTOR
Frank E. Wolcott
By
ATTORNEY Patented July 28, 1942

2,291,427

UNITED STATES PATENT OFFICE 2,291,427

COFFEE MAKER

Frank E. Wolcott, West Hartford, Conn., assignor to The Silex Company, a corporation of Connecticut Application November 1, 1938, Serial No. 238,207

1 Claim. (Cl. 210—162)

My invention relates to coffee makers.

It has among its objects to provide an improved coffee maker, and, more particularly, such an improved coffee maker of the vacuum type. A further object of my invention is to provide such an improved coffee maker having improved filtering mechanism disposed between and cooperating in an improved manner with the liquid moving between upper and lower bowls thereof, whereby improved coffee making results are obtained. A still further object of my invention is to provide an improved filtering mechanism especially adapted to be used in connection with such a coffee maker, and, more particularly, such an improved filtering mechanism of the so-called rod type. Other objects including the provision of an improved construction whereby it is made possible, among other advantages, to eliminate the objection to previous rod type strainer mechanisms, that the coffee produced is either cloudy and of inferior flavor, or the infusion process is necessarily so lengthy as to make the use of such straining devices wholly impractical. Still another object of my invention is to produce an improved filter rod structure wherein, by reason of an improved construction, it is made possible to obtain markedly increased drainage area and improved results arising therefrom and not previously obtainable with this type of filter. These and other objects and advantages of my improved construction will, however, hereinafter more fully appear.

In the accompanying drawing I have shown for purposes of illustration one embodiment which my invention may assume in practice.

In the drawing,

Figure 1 is a side elevation, partially in section, of a vacuum type coffee maker equipped with my improvements;

Fig. 2 is an enlarged detail view of my improved filter rod in position in the coffee maker, the filter disc shown in Figure 1 being shown in section to facilitate illustration;

Fig. 3 is a further sectional view similar to Figure 2, but with the filter cup of my improved construction also shown in section;

Fig. 4 is a transverse sectional view on line 4—4 of Figure 2;

Fig. 5 is a detail plan view of one of the filter discs;

Fig. 6 is an exploded view showing the various parts of the filter rod spaced one above another to facilitate illustration, and Fig. 7 is a view of that portion of the filter rod shown in Figure 3, but with the vitreous coating in section and exaggerated to facilitate illustration.

In this illustrative construction, I have shown a coffee maker of the well known vacuum type comprising an upper bowl 1 and lower bowl 2, the latter carrying a usual handle 3, and the upper bowl having a stem 4 projecting down through a seal 5 into the neck 6 of the lower bowl; an improved filter mechanism, herein of the rod type and generally indicated at 7 and hereinafter more fully described, being seated over the mouth 8 of the stem 4.

Referring more particularly to the filter mechanism, note that the same herein comprises upper and lower rod portions 9 and 10 and a filtering cup or drainage portion 11 intermediate the portions 9 and 10, the portion 11 cooperating with a suitable filter disc 12, of fabric, paper or the like, carried on the mechanism 7 and seated between the cup portion 11 and the mouth 8 of the stem 4 on the upper bowl. Attention is, moreover, directed to the fact that this improved filter mechanism 7 is herein preferably of such weight as under all operating conditions to prevent lifting of the mechanism relative to its seat on the upper bowl, and to the further fact that the cup or drainage portion 11 is of an improved construction whereby the drainage area is markedly increased, as compared with previous filter mechanisms of the rod type.

Considering first the drainage portion 11, it will be noted that the same is herein in the form of a hollow member or cup of greater diameter than the portions 9, 10 and which is open at the top and has those portions 9, 10 disposed axially relative thereto. As shown, this cup member 11 is provided with an upwardly and outwardly curved, round, outer face 13, which herein at its bottom is but slightly larger than the diameter of the rod portion 9 and is also of maximum diameter at its top as at 14. Thus, the surface 13 is adapted to be received in and conform generally to the shape of the mouth 8 of the stem on the upper bowl while engaging and pressing against the inner surface of the mouth 8 the filtering disc 12, irrespective of the variations in the shape of said mouth inherent in such glass articles. Further, it will be observed that the face 13 is apertured, the same herein being provided with a plurality of filtering or drainage apertures 15 providing communication between exposed inner portions of the disc 12 and the hollow interior of the cup member 11. As shown, these apertures are each elongated and arranged substantially parallel to one another and at an angle to a radial vertical plane, as illustrated, in such manner as thereby to produce a large total drainage area and one which extends above and below the portion of the disc 12 pressed by the face 13 against the adjacent wall of the mouth 8. Further, to increase the drainage area, it will also be noted that these apertures are herein wider than the remaining portions 13 between the same, so that a series of ports 15 of large area is thus provided in the members 11 which extends completely around the latter. Due to the curvature of the parts and the above described disposition of these ports relative to one another, it will also be observed that these ports are so disposed that the fluid must flow through the filter disc 12 when flowing up or down between the bowls.

While in my improved construction the filter member 11 may, if desired, be cast or otherwise formed integral with both portions 9 and 10, all of these elements are separately formed in the illustrative construction. Thus, as shown, the member 11 is provided with a reduced portion 16 on its lower end into which projects the lower end of the separate member constituting the portion 9, and this portion 16 also carries a bottom portion 17 axially apertured as at 18 to receive a connecting portion 19 on the upper end of the separate member constituting the portion 10. Herein, this portion 19 is formed on a reduced upper end of the lower member or rod 10 so that a shoulder 20 on this rod presses against the bottom 17 of the member 11. Moreover, the portion 19 is received in an axial recess 21 in the lower end of the upper member or rod 9, and the portion 19 is also suitably roughened, knurled or grooved in such manner as to permit the rods 9 and 10 to be driven together to produce a unitary construction having the cup 11 positioned between adjacent portions of these rods. As shown, the lower end of the rod 9 is also preferably bevelled, as shown at 22, to conform to the inner curved surface of the member 11 and permit the member 9 to be of increased diameter as hereinafter described; this member 9, which also forms the handle member, also preferably being provided with a suitable enlargement or knob 23 on its upper end.

Obviously, the weight of my improved drainage mechanism may be distributed in various ways while continuing to obtain sufficient weight to prevent lifting of the same relative to the filter disc and the mouth of the upper bowl stem during operation. Thus, one or both of the rods may be made of any suitable plastic or vitreous material, and the drainage member 11 may be made of metal, or the member 11 may be made of suitable plastic or vitreous material with one or both of the rods 9 and 10 made of metal, or all may be made of plastic material and suitably weighted as desired. However, herein I have shown the same as all made of metal, as I find that this gives the desired weight while enabling the parts to be inexpensively produced as separate elements. Further, when such metal parts are coated as, for example, with a suitable covering 24 of vitreous material, as, for example, enamel, illustrated in exaggerated form in Fig. 7, a structure of the desired weight is produced inexpensively and satisfactorily, while all portions of the metal are as effectively kept out of contact with the liquid as if they were all made of vitreous material. Here also it will be understood that although the rod 9 is herein of greater cross section and resultant weight than the rod 10, this arrangement may be reversed if desired.

In the use of my improved construction, it is found that, as a result of the filtering member 11 remaining seated throughout the coffee making operation, I effectually overcome the tendency of previous filters of this type to permit silt to pass down under the movable valve previously provided as the valve returns to its seat, and the consequent subsequent delivery of this silt to the brewed coffee when the same is returned after infusion from the upper bowl to the lower bowl. Further, despite the fact that the filtering mechanism thus remains constantly in position, it is found that due to the markedly increased drainage area and the shape and location of the drainage apertures provided, it is possible for the liquid in the lower bowl to pass freely upward into the upper bowl to effect infusion. Moreover, it is similarly found that the shape and location of these apertures is particularly effective in cooperating with the filtering disc in enabling the return of the brewed coffee from the upper bowl to the lower bowl within the limits of a normal infusion. Thus, it is possible with my improved construction and while obtaining clear coffee, to reduce the time required for this return to approximately five minutes, i. e. to about one-third to one-fourth of that previously required in order to obtain clear coffee in previous rod type filters. This result is believed to be particularly due to the use and arrangement of the elongated apertures which markedly increase the available drainage area while, due to their angularity also tending to induce a free whirling flow and also tending to agitate the grounds, as compared with previous structures which restricted the return flow to such very limited and slow flows as those possible between imperfectly fitting or roughened surfaces or through minute grooves in the filter ball or knob, while also obtaining only a relatively straight flow. This, further, is a feature of decided importance, as it is well recognized that after a normally period of infusion in the lower bowl, the coffee should be promptly returned to the lower bowl in order to produce coffee of the best flavor. Obviously, the rod remaining seated throughout its operation, the structure is also substantially noiseless in operation and also uniformly effective, as distinguished from variations in effectiveness arising from uneven accumulations of grounds beneath the filtering valves previously provided.

As a result of my improved construction, it is also possible to use a simple and inexpensive axially apertured filter disc and to use discs of different thickness or density to vary the infusion period as desired. This disc is also readily strung on the rod structure and insertable thereon, while also being readily removable after use either with the rod structure or when dumping the grounds out of the upper bowl. Further, it will be observed that this disc 12 may vary in size and that the portions of the same remote from the axial apertures therein are so engaged by those portions of the face 13 on opposite sides of the apertures 15 and the remaining surface 16 of the member 11 as to produce effective filtering, irrespective of whether or not the aperture in the filter disc exactly fits the lower rod 10. Attention is also directed to the fact that the filter member or cup 11, in addition to having the markedly increased drainage area provided by its drainage apertures 15, also, as a result of its hollow construction, provdes a reservoir above these apertures in which the coffee grounds may be so collected as themselves to exert a straining action on the liquid coffee before it passes through the filter disc, thereby obtaining the advantages of such filtering action, in addition to the filtering action of the disc. It will also be observed that the construction produced, whether of initially integral construction or formed of a plurality of parts so connected as, in effect, to form an integral device, is such as to eliminate all possible contact of the liquid with metal, while also producing a structure which may be very readily cleansed. These and other advantages of my improved construction will, however, be clearly apparent to those skilled in the art.

While I have in this application specifically described one embodiment which my invention may assume in practice, it will be understood that this form of the same is shown for illustrative purposes and that the same may be embodied in various other forms without departing from its spirit or the scope of the appended claim.

What I claim as new and desire to secure by Letters Patent is:

A rod type filter for vacuum coffee makers receivable in the upper bowl of such a coffee maker and having upper and lower rod portions and an intermediate cup portion receivable in and seating on the mouth of the stem of an upper bowl and having lateral apertures in the walls of said cup portion opening toward a seat on said mouth, said rod and cup portions being each separately formed and said rod portions clamping said cup portion between the same.

FRANK E. WOLCOTT.